(12) United States Patent
Morton et al.

(10) Patent No.: US 10,162,117 B2
(45) Date of Patent: Dec. 25, 2018

(54) UNCOOLED OPERATION OF MICRORESONATOR DEVICES

(71) Applicants: Paul A. Morton, West Friendship, MD (US); Jacob Khurgin, Pikesville, MD (US)

(72) Inventors: Paul A. Morton, West Friendship, MD (US); Jacob Khurgin, Pikesville, MD (US)

(73) Assignee: Morton Photonics, West Friendship, MD (US)

( * ) Notice: Subject to any disclaimer, the term of this patent is extended or adjusted under 35 U.S.C. 154(b) by 511 days.

(21) Appl. No.: 14/217,663

(22) Filed: Mar. 18, 2014

(65) Prior Publication Data
US 2016/0161676 A1 Jun. 9, 2016
US 2018/0217332 A9 Aug. 2, 2018

Related U.S. Application Data

(63) Continuation-in-part of application No. 13/044,669, filed on Mar. 10, 2011, now Pat. No. 8,718,421, (Continued)

(51) Int. Cl.
*G02B 6/42* (2006.01)
*G02F 1/01* (2006.01)
(Continued)

(52) U.S. Cl.
CPC ....... *G02B 6/29395* (2013.01); *G02B 6/2861* (2013.01); *G02B 6/29343* (2013.01); *G02B 6/29398* (2013.01); *G02B 6/4286* (2013.01); *G02F 1/011* (2013.01); *G02F 1/0147* (2013.01); *H01Q 3/26* (2013.01); *H01Q 3/2676* (2013.01); *H01Q 3/2682* (2013.01); (Continued)

(58) Field of Classification Search
CPC .................................................. G02B 6/29395
See application file for complete search history.

(56) References Cited

U.S. PATENT DOCUMENTS

6,636,668 B1 * 10/2003 Al-hemyari ........ G02B 6/12007
385/16
9,081,135 B1 * 7/2015 Jones ...................... G02F 1/025
(Continued)

*Primary Examiner* — Edwin C Gunberg
(74) *Attorney, Agent, or Firm* — Nadya Reingand; Yan Hankin (57) ABSTRACT

This invention removes the need to provide temperature control for an optical time delay chip, which is usually provided by a thermo-electric-cooler, in order to significantly reduce the power dissipation of the device and allow 'uncooled' operation. Uncooled operation is achieved by monitoring the temperature of the chip, and changing the tuning of each microresonator within the device in order to continue providing the required time delay as the temperature is varied. This invention takes advantage of the fact that microresonators provide a series of resonant wavelengths over a wide wavelength range, so that the closest resonance wavelength below the operating wavelength can always be tuned up to that wavelength. When the device temperature changes, this is accounted for by both the choice of resonance wavelengths and the tuning for each of the microresonators in the device, in order to keep the correct tunable delay.

20 Claims, 6 Drawing Sheets

Related U.S. Application Data which is a continuation-in-part of application No. 12/897,219, filed on Oct. 4, 2010, now Pat. No. 8,406,586, which is a continuation-in-part of application No. 12/205,368, filed on Sep. 5, 2008, now Pat. No. 7,831,119.

(51) Int. Cl.
    *G02B 6/28*     (2006.01)
    *G02B 6/293*     (2006.01)
    *H01Q 3/26*     (2006.01)

(52) U.S. Cl.
    CPC .... *G02F 2201/20* (2013.01); *G02F 2203/055* (2013.01); *G02F 2203/15* (2013.01)

(56) References Cited

U.S. PATENT DOCUMENTS

| | | | |
|---|---|---|---|
| 2008/0080864 A1* | 4/2008 | Bai | G02B 6/12019 398/79 |
| 2009/0123107 A1* | 5/2009 | Khurgin | G02F 1/011 385/1 |

* cited by examiner

UNCOOLED OPERATION OF MICRORESONATOR DEVICES

CROSS-REFERENCE TO RELATED APPLICATIONS

This patent application is a continuation-in-part of the U.S. patent application Ser. No. 13/044,669 filed on Mar. 10, 2011.

STATEMENT REGARDING FEDERAL SPONSORED RESEARCH AND DEVELOPMENT

This invention was made with U.S. Government support under Contract W31P4Q-09-C0298 with DARPA MTO SBIR Project, and the U.S. Government has certain rights in the invention.

FIELD OF INVENTION

This invention relates to an active array antenna system for use in microwave photonics. More particularly it addresses tunable delays to control phased array antennas.

BACKGROUND

Figure 1:
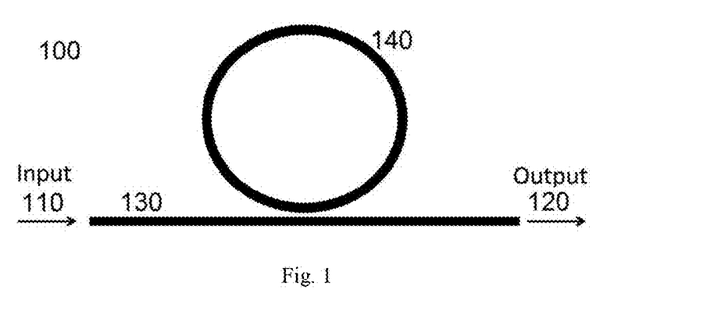
FIG. 1 shows an optical microresonator coupled to a single optical waveguide (Prior art).
Figure 2:
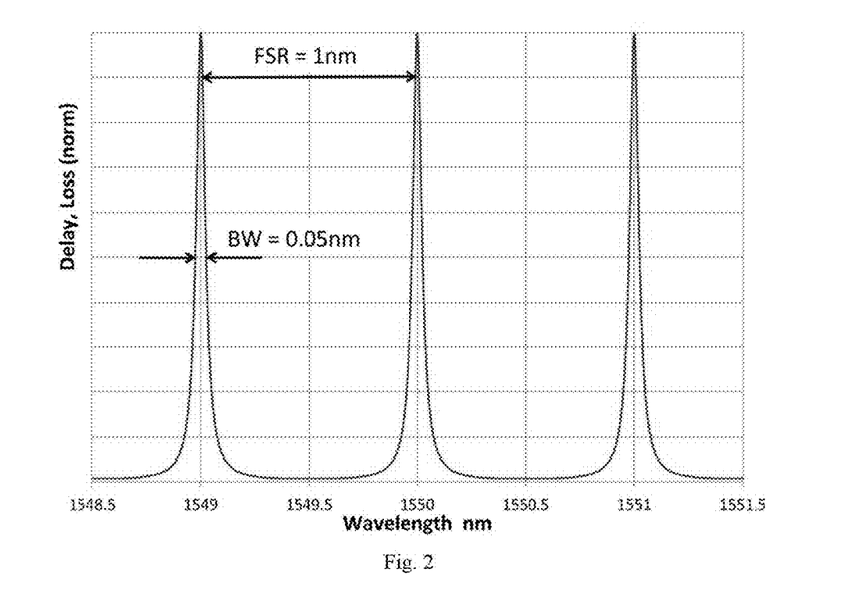
FIG. 2 shows an example optical loss spectrum for such the microresonator of FIG. 1.
Figure 3:
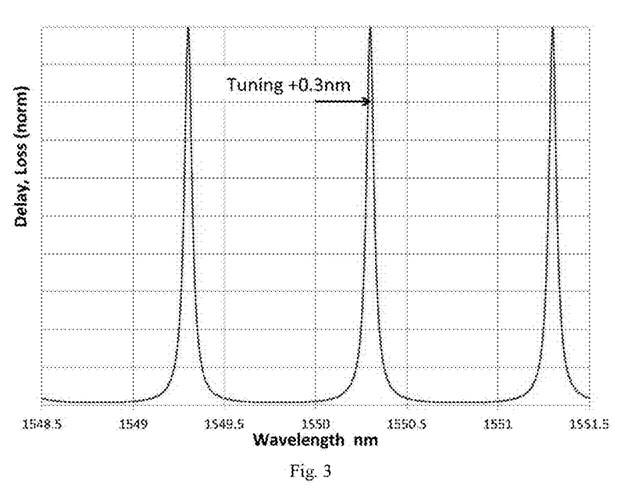
FIG. 3 shows the resonances 'tuned up' in wavelength due to heating.
Figure 4:
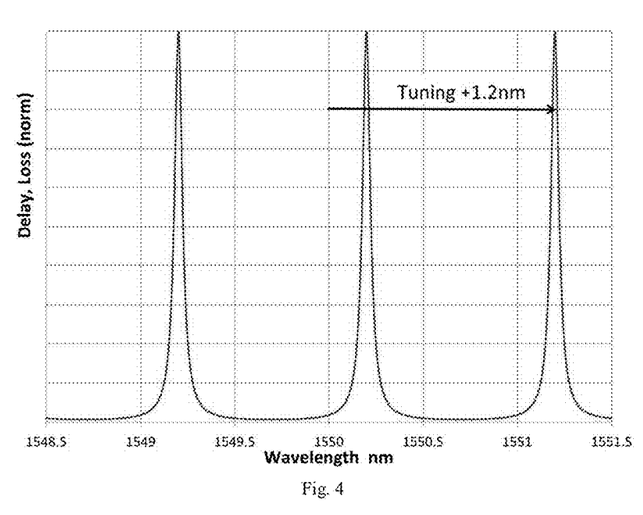
FIG. 4 shows tuning beyond a single FSR.

One of the major issues of optical microresonator devices is that their operating wavelength (or conversely, frequency) is temperature sensitive, making it necessary to temperature control the device for many practical applications. As an example, consider an optical microresonator 140 coupled to a single optical waveguide 130 (shown in FIG. 1), with an input optical signal 110 and an output optical signal 120; assume that the coupled optical microresonator 100 has a bandwidth of 0.05 nm, a Free-Spectral-Range (FSR) of 1 nm, and an operating wavelength close to 1550 nm. An example optical loss spectrum for such a microresonator is shown in FIG. 2 for a specific ambient temperature, e.g. room temperature—the resonances occur over a wide wavelength range, e.g. 100 nm or more. When the temperature is increased or decreased, the effective index of the optical waveguide making up the microresonator changes, therefore changing the effective length of the microresonator, which then changes the wavelengths of the microresonator resonances. This is shown in FIG. 3, which shows the resonances 'tuned up' by 0.3 nm due to heating. It is in fact this thermal variation of the microresonator, or tuning, of its resonances, that is used in the tunable time delay described in the original patent (U.S. Pat. No. 7,831,119 B2) that this new concept builds upon. By changing the temperature of the microresonator, the resonance wavelength can be tuned considerably, such as shown in FIG. 4—it can be tuned beyond a single FSR; this allows a resonance to be moved to any optical wavelength within a broad operating wavelength range by first choosing the closest resonance, and then tuning that resonance to the required operating wavelength by changing its temperature.

Figure 5:
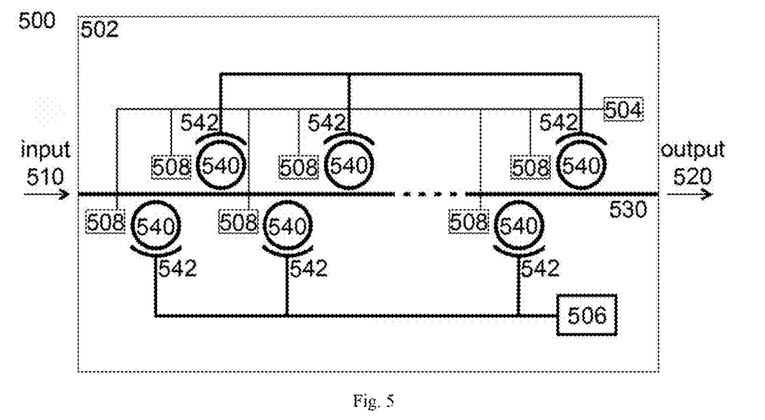
FIG. 5 shows the optical time delay device comprised of an even number of optical microresonators coupled to a single waveguide.

An example of an optical time delay device incorporating a series of independent optical microresonators is shown in FIG. 5. The optical time delay chip includes multiple optical microresonators, similar to those shown in FIG. 1, coupled to a single optical waveguide; the number of microresonators is typically an even number, varying from a small number such as 10 up to a large number greater than 100. The output signal of the device includes the effects of the optical resonances of each of the microresonators acting on the device input signal. The even number of microresonators is split into two sets of microresonators for use in the Balanced SCISSOR approach (U.S. Pat. No. 7,831,119 B2), which provides tunable optical delay with wide bandwidth and low distortion to a signal. The two sets of microresonators are initially aligned with the signal wavelength, which is achieved by first setting the overall chip temperature, so that all of the microresonators provide resonances that are below the operating wavelength of the signal (FIG. 6, 610), then the heaters on each of the microresonators are used to tune their resonances up to the operating wavelength of the signal, in this case at 1550 nm, 620. The Balanced SCISSOR concept then tunes one set, comprised of half of the microresonators, up in wavelength and one set, comprised of the other half of the microresonators, down in wavelength at the same time to produce a variable time delay, which is dependent on the wavelength offset of the two sets of microresonators, 630.

The Balanced SCISSOR approach requires that the overall chip temperature be held at a fixed temperature, typically by using a Thermo-Electric-Cooler (TEC) to heat or cool the device, plus a thermistor on or close to the device to measure its temperature and provide feedback to control the TEC. If the tuning range of the microresonators is less than the FSR, then in order for the device to be able to operate at any wavelength it is necessary to change the temperature of the entire chip to first place the resonances in the correct position relative to the operating wavelength, before the microresonators are then tuned to the operating wavelength. The use of a TEC to control the temperature of the device adds significant power dissipation to the overall packaged device, as well as additional size and cost. If at all possible it would be of great utility to remove the need to use a TEC for correct device operation.

SUMMARY

The present invention removes the need to provide temperature control of an optical time delay chip, which is usually provided through the use of a thereto-electric-cooler (TEC) and temperature sensor in a feedback loop, in order to significantly reduce the power dissipation of the time delay device and allow it to be operated in an 'uncooled' mode. The need for temperature control of the chip is removed by monitoring the temperature of the chip, and then modifying the tuning of each microresonator within the time delay device in order to continue providing the required time delay even as the temperature is varied. This approach takes advantage of the fact that the microresonators include a series of resonant wavelengths over a wide wavelength range, separated by the FSR of the microresonator, so that the closest resonance wavelength below the operating wavelength can always be chosen to be tuned up to the operating wavelength. When the device temperature changes, this is accounted for in both the choice of resonant wavelength and tuning of the microresonators in order to keep the correct tunable delay.

In addition to monitoring the temperature of the overall time delay device, the use of temperature sensors at each microresonator is described. The invention includes the measurement of optical power before and after the time delay device, to allow for self testing of the device, and also to better optimize the alignment of microresonator resonant wavelengths with the operating wavelength of the device. A further element of the invention includes a direct measurement of the optical delay provided by the device, by measuring the phase delay between the microwave signals before and after the time delay device, and then utilizing this phase delay in a feedback loop to compare the requested and measured time delay, and minimize the difference.

A further object of this invention leaves the time delay device operation the same irrespective of its operating temperature, but then modifies the operating wavelength used in the system to keep this laser source wavelength the same as the operating wavelength of the time delay device—which is varying with ambient temperature, therefore supporting uncooled operation of the time delay device.

DETAILED DESCRIPTION OF THE PREFERRED EMBODIMENT

The idea of this invention is to remove the need for temperature control of the time delay chip, while it provides a tunable time delay. The approach is based on the necessity to keep the time delay of a given microresonator equal to a given value independent of the temperature of the whole chip.

This is accomplished by first ensuring a large enough tuning range of the microresonator resonance frequencies, which must be larger than (1+Delta)×FSR, where 'Delta' is a value from 0 to 1. Next, the chip temperature is allowed to float with the ambient temperature, while utilizing an algorithm to calculate the temperature tuning (heating) required for each microresonator to provide the correct resonance frequency based on the required delay and the overall chip temperature. As long as the temperature of the chip is varying much slower than the update rate of the required chip delay value, the constant switching from one delay value to the next can encompass the small chip temperature change occurring since the last switching event, and when necessary choose to tune an adjacent resonance to the correct wavelength to continue tuning the delay as required.

Figure 6:
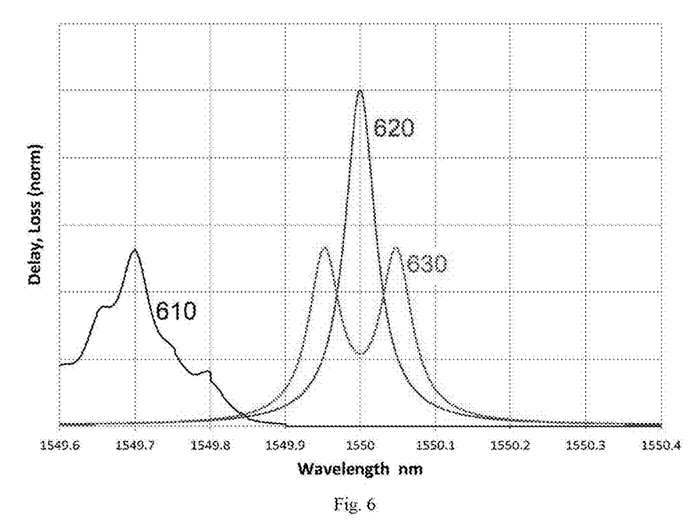
FIG. 6 shows the Balanced SCISSOR concept: 610 shows the initial response before tuning the microresonator resonances, when they are all below the operating wavelength of the signal; 620 shows the microresonators response for resonances tuned up to the operating wavelength by the heaters; 630 shows the two sets of resonances that are aligned around the operating wavelength of the system.

The 'Delta' parameter depends on the variation in resonance wavelengths at a fixed device temperature for the multiple microresonators on one device, which often occurs due to imperfections in lithography and processing, even if all resonances are designed to be at the same wavelength. If all resonances are exactly lined up in wavelength when the chip is at a fixed temperature, then Delta is zero. If there is a variation of resonance wavelengths (typical with current technology, as shown in FIG. 6, 610), then Delta is obtained from the maximum wavelength variation (max–min wavelength) of the microresonators, which must be overcome by tuning (e.g. using heaters) all the lower resonance wavelengths up to the max wavelength before additional ensemble tuning can be carried out; then Delta=(max wavelength–min wavelength)/FSR. In the case where the spread in the resonance wavelengths of individual microresonators is very large, greater than the FSR, then Delta=1. In the case where a large number of resonances are added together to provide a single "Super-Ring" resonance (see patent application # U.S. Ser. No. 13/044,669 'Super-Ring Resonator Based Devices'), then the Delta in that case is zero.

The operation of this invention is described as follows: An optical time delay device 500 incorporating a series of independent optical microresonators 540 is shown in FIG. 5. The optical time delay chip 502 includes multiple optical microresonators 540, coupled to a single optical waveguide 530. The output signal of the device 520 includes the effects of the optical resonances of each of the microresonators acting on the device input optical signal 510. Each microresonator has a means to tune its resonant wavelengths, 542, which in the preferred embodiment is a heater. The time delay chip may also include one or more ballast heaters that do not heat a specific microresonator, rather they heat the overall chip, 506, to keep the overall heating to the chip constant. Each microresonator may also have a sensor to measure its temperature, 508, additionally there is a single sensor added to the time delay device to measure the overall chip temperature, 504.

The microresonators (typically an even number) are split into two sets for use in the Balanced SCISSOR approach (U.S. Pat. No. 7,831,119 B2), which provides tunable optical delay with wide bandwidth and low distortion to a signal. The two sets of microresonators are initially aligned with the signal wavelength, which is achieved by first setting the overall chip temperature, so that all of the microresonators provide resonances that are below the operating wavelength of the signal (FIG. 6, 610), then the heaters on each of the microresonators are used to tune their resonances up to the operating wavelength of the signal, at 1550 nm in 620. The Balanced SCISSOR concept then tunes one set, comprised of half of the microresonators, up in wavelength and one set, comprised of the other half of the microresonators, down in wavelength at the same time to produce a variable time delay, which is dependent on the wavelength offset of the two sets of microresonators, 630.

Figure 7:
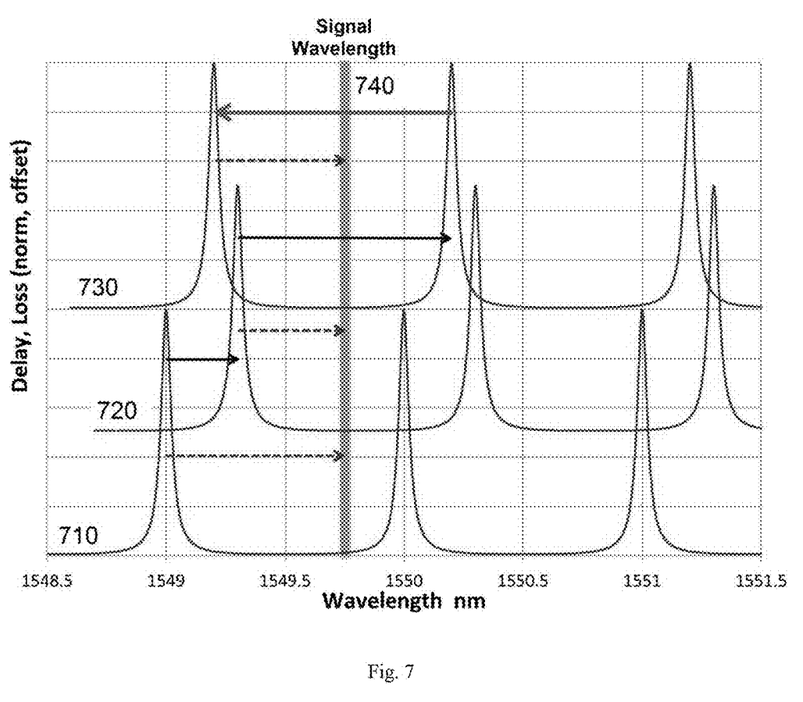
FIG. 7 shows the operation of the device of the present invention.

Consider an initial ambient temperature, T1, where the two sets of resonances are aligned around the operating wavelength of the system, as seen in FIG. 6, 630. As the system utilizing the delay, e.g. a phased array system, requires the delay to be changed relatively quickly, e.g. at 10 kHz, new delay values will be used to calculate new microresonator wavelengths for the two sets of microresonators, which will be used to calculate new heater values (e.g. voltages) to be applied to each microresonator heater. In this case, every 100 microseconds new heater voltages will be used to move the resonances of each microresonator to the correct wavelength. As the ambient temperature of the device changes, either to higher or lower temperature, this temperature change can be taken account of in the calculated heater values required to move the microresonator resonance wavelengths to the required values; for increased temperature the required microresonator heating is reduced, and for reduced temperature the required heating is increased. For continuous increase or decrease in overall device temperature, the algorithm will eventually reach the point where; for increased temperature the required microresonator heating is reduced to zero and cannot be reduced further, and for reduced temperature the required heating is increased to the maximum allowed and cannot be increased further—at this point, the algorithm will choose to tune an adjacent microresonator resonance to the required wavelength; for increased temperature that would be the next lower wavelength resonance, and for reduced temperature the next higher wavelength resonance. In this way, no matter the temperature of the device, the algorithm can provide the required heater values to place the microresonators around the operating wavelength and provide the correct delay value. This operation is described schematically in FIG. 7, in which the operating wavelength of the signal is shown by a thick vertical line 740 around a wavelength of 1549.75 nm The resonance characteristics of a microresonator, before tuning, are shown at three different temperatures. The resonance characteristic at an initial temperature 710, in which heating of the microresonator is required to move the initial resonance up to the signal wavelength—shown by the dashed blue arrow. As the ambient temperature increases, as shown in 720, less heating is required to move the resonance up to the signal wavelength. As the ambient temperature increases further, as shown in 730, which places the initial resonance above the operating wavelength, the algorithm chooses to utilize the next lower resonance of the microresonator, which it heats up the required amount to move it to the signal wavelength.

Using this same concept; a device with a broad tuning capability, >(1+Delta)*FSR, and using the algorithm described above to choose which microresonator resonance to tune to the operating wavelength, the device can support any operating wavelength within the broad range where the device is designed to operate. This provides a device that can perform over both arbitrary ambient temperature and arbitrary operating wavelength, over the large ranges where the device can operate. The ambient temperature range may be very large, limited only by the materials used in the waveguides and heaters, e.g. −55° C. to +125° C. or greater. The operating wavelength range will depend on the performance of the optical waveguide and the coupler to the microresonator, supporting wide operating wavelengths e.g. the C+L Bands around 1550 nm.

In practice, the overall chip temperature will be measured (e.g. with a thermistor) 504 and used to calculate the heater drive for each microresonator based on calibration information, such as stored in a look-up table. Additionally, temperature values measured for each individual microresonator can also be used to calculate the heater drive required for each individual microresonator; these temperature values can be obtained by integrating a temperature sensing element at each microresonator 508. This could be as simple as monitoring the resistance of the heater for that element, which varies with temperature, e.g. for a specific voltage applied to the heater element the current can be measured on the circuit board and the voltage and current values used to deduce the temperature of the heater and the microresonator itself.

Providing microresonators with the required tuning range, (1+Delta)*FSR, can be achieved by utilizing efficient heaters to provide a significant temperature tuning range, by using a waveguide material with significant temperature tuning characteristics, and/or by reducing the FSR of the microresonator by increasing the microresonator's waveguide length. These requirements have been shown in a number of materials and devices used for microresonators, such as silicon or silicon nitride based waveguide microresonator devices.

The concept will also work with alternative tuning mechanisms other than thermal tuning, to change the resonance wavelength of the microresonators by another means 542, including carrier modulation, the use of liquid crystal, polymer or other materials to change the effective index of the waveguide, or mechanical variations to change the resonance wavelengths; in all cases, what is required is sufficient tuning range to support arbitrary chip temperatures and operating wavelengths, i.e. tuning≥(1+Delta)*FSR.

The thermal tuning approach described in this continuation, which at times requires for the tuning of one microresonator to be moved from one resonance to the next resonance, may violate the Balanced Thermal tuning concept (described in U.S. Pat. No. 8,406,586 B2), by changing the overall heating applied to the chip and causing a thermal transient to occur. This can be overcome by including one or more additional ballast heaters to the time delay chip, 506, that are not connected to any optical microresonator, rather used only to carry out fine balancing of the heat added to the chip, keeping it constant and avoiding or reducing thermal transients.

Figure 9:
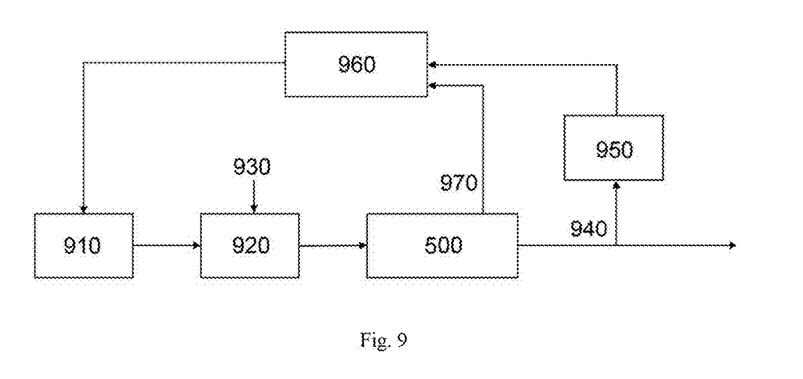
FIG. 9 shows a control loop for tuning the laser wavelength to keep it aligned with the time delay device operating wavelength as its temperature varies.

Another approach to supporting uncooled operation of the time delay device as the temperature of the device changes is to tune the operating wavelength of the laser used with the time delay device, in order to track the operating wavelength of the time delay device. This approach is shown in FIG. 9. The optical system incorporating the time delay device 500 includes a laser providing a continuous wave optical output at a single wavelength 910. An electrical signal 930 is imposed on the optical wavelength using a modulator 920, such as a Lithium Niobate Mach-Zehnder interferometer based optical modulator, providing the optical signal to the time delay device 500. The time delay device will be operated the same way irrespective of temperature, providing the Balanced SCISSOR tunable delay required for system operation. The time delay chip temperature will be monitored in order to know the required operating wavelength for the laser, using a temperature sensor (such as a thermistor), with a sensor output 970. The temperature sensor output 970 is input to a processing unit 960, which calculates the required laser wavelength based on the chip temperature, and provides the required signals to tune the laser wavelength to keep it optimally aligned with the time delay device optical resonances. The laser wavelength tuning required is ≥(1+Delta)*FSR of the microresonator based time delay device. For lasers with a larger wavelength tuning capability, such as a standard distributed feedback (DFB) laser, the laser can be tuned to follow the operating wavelength of a single microresonator resonance as the time delay device is operated over its entire temperature range, e.g. from −55° C. to +125° C.

Additionally, a small portion of the output optical signal from the time delay device can be tapped off, 940, and the power of that signal monitored with an optical detector 950. This tap and monitor detector could be alternatively integrated onto the time delay chip, rather than external as shown in FIG. 9. The power level monitored by 950 is input to the processing unit 960, in addition to the temperature sensor signal 970, and the processing unit can use one or both of these signals in order to calculate the optimum wavelength of the laser 910, and to provide the required wavelength control signals to the laser 910.

In addition to monitoring the temperature of the optical time delay device, in order to know the resonance frequencies of the microresonators within the device (e.g. from a lookup table), this invention includes the idea of monitoring the optical signal passing through the device, either on the optical time delay chip or after the chip. In one embodiment, the microresonator based time delay device could include a coupler in its output waveguide, taking a small percentage of the output optical power to an integrated photodetector. The power to the photodetector can be monitored; this power (loss) is proportional to the optical delay in the device. The measurement path may include optical filters with frequency dependent transmission characteristics, integrated on to or separate from the time delay device. A second measurement path could include a coupler on the input to the time delay device in order to couple a small percentage of the input signal, which can also be measured at a photodetector with or without an intermediate optical filter. This measured information can be used, together with an algorithm to move the resonance wavelengths of the different microresonators, in order to carry out self-testing of the device. The same measurement information can also be used in a feedback loop in order to optimally align the laser wavelength and microresonator resonances, e.g. maximizing or minimizing signal power, or adding a dither frequency and using it to place the resonances at the correct wavelength (or conversely placing the laser wavelength at the correct place relative to the resonances).

Figure 8:
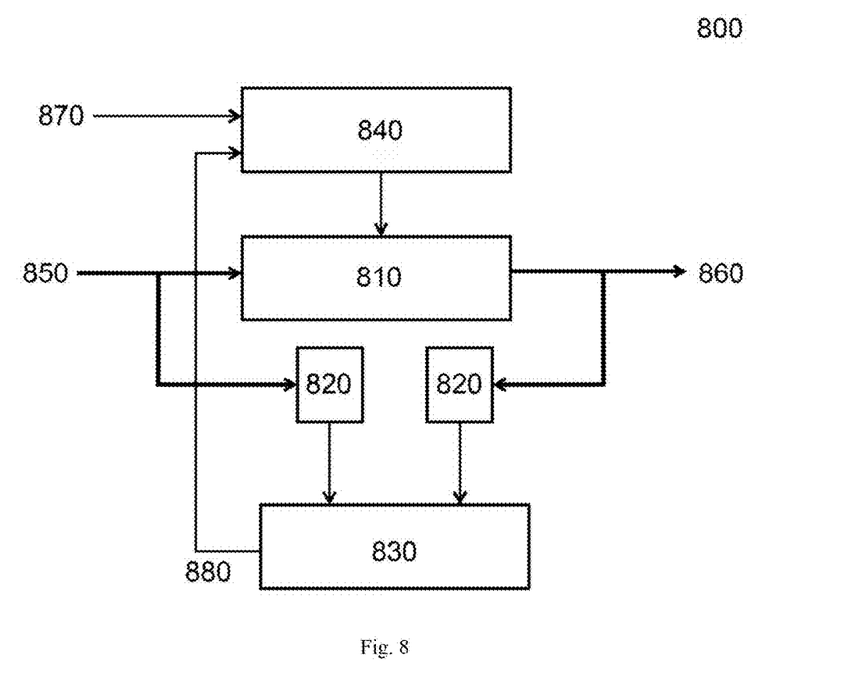
FIG. 8 shows a control loop for maintaining a precise value of the time delay.

For highest performance of the time delay device it is desirable to provide a control loop that can measure the actual delay achieved by the device, compare that with the requested delay value, and make adjustments to provide the requested delay value. For fast operation and compactness it is desirable to have this control loop in close proximity to the delay line, eventually, and preferably, on the chip itself. Measurement of the time delay is difficult; it can be done with a short optical pulse, however, this involves the inclusion of an analog-to-digital converter—similar to having a dedicated fast digital sampling oscilloscope with associated processor in order to determine the time delay. This invention utilizes the fact that the time delay of an optical signal is equivalent to the phase delay of the modulating microwave signal. The scheme is shown in FIG. 8. A controller 840 is used to set the resonance wavelengths of the microresonators on the tunable time delay device 810, providing the requested time delay. The controller 840 has two inputs—one the requested delay 870 and the other the measured delay 880, provided from a microwave phase detector 830. The microwave phase detector 830 is fed by microwave signals from two optical detectors 820. The first optical detector receives a portion of the input optical signal 850, tapped before the input of time delay device 810, and the second optical detector receives the delayed optical signal tapped from the output of time delay device 860. The phase difference between the microwave signals coming from the two optical detectors 820 is $\delta\phi\square\Omega_{RF}\cdot t_{delay}$.

The operation of the phase detector 830 is described in (G. Ohm, M. Alberty IEEE Transactions on Microwave Theory And Techniques, Vol. Mtt-29, No. 7, Jul. 1981).

The measured delay time 880 is input to the controller 840 where it is compared with the requested delay time 870, and used to calculate new drive levels for the heaters of the microresonators in the time delay device; this loop is iterated until the measured delay time becomes equal to the requested delay time.

Figure 10:
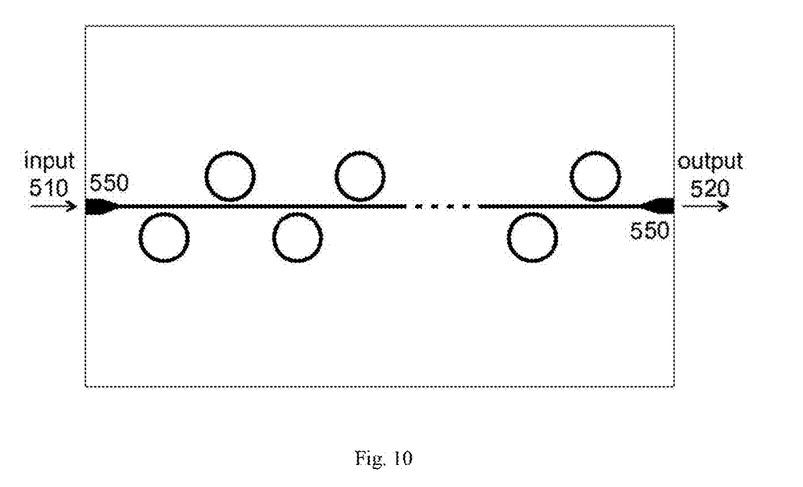
FIG. 10 shows the time delay device with beam expanded input and output.

In order to operate the device uncooled over a wide ambient temperature range, while maintaining one of the key requirements of a tunable optical delay device—low optical loss, it is important to keep the coupling loss of light from an optical fiber into the device and out of the device very low even as the temperature varies. This is difficult in devices with the small optical waveguide dimensions needed to produce optical microresonators for time delay. One way to overcome this issue, as shown in FIG. 10, is to include an optical beam expander 550 on the input and output side of the device. The beam expanders expand the small optical mode used within the time delay device to a larger size to provide low loss coupling together with a low sensitivity to optical alignment to the optical input 510 and optical output 520. The improved coupling scheme significantly reduces the total coupling loss, and the variation in optical loss that occurs from the small mechanical movements of the coupled parts relative to each other as the temperature changes over a wide range.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. An optical device allowing uncooled operation, comprising:
    a chip, the chip having M loop resonators (M≥2), the optical device receiving incoming light at an operating wavelength and outputting modified light, wherein a peak delay of the device is larger than a peak delay of a single microresonator;
    each microresonator having a means which provides a tuning capability≥(1+Delta)·FSR, where Delta describes a variation in resonance wavelengths of the microresonators, 1≥Delta≥0; and M means adjusting the resonant wavelengths of the microresonators relative to the operating wavelength of the device.

2. The device of claim 1, wherein the means provide enough tuning capability to shift at least one of resonances of a given microresonator anywhere within one FSR value from the operating wavelength.

3. The device of claim 1, further comprising sensors to measure a chip temperature, which is then used to calculate a tuning required for each microresonator.

4. The device of claim 3, wherein the chip temperature is measured with a thermistor.

5. The device of claim 1, wherein the means are heaters.

6. The device of claim 5, wherein the temperature of each microresonator is measured by a separate temperature sensor.

7. The device of claim 5, wherein the temperature of each microresonator is measured by the resistance of the corresponding heater itself.

8. The device of claim 1, further comprising a ballast heater, which provides a constant thermal load for the chip to avoid thermal transients and therefore keeping the balanced thermal tuning.

9. The device of claim 1, in which the microresonator resonance wavelength tuning is obtained by mechanisms other than thermal tuning, including carrier density modulation, liquid crystals, polymer or other materials to change the effective index of the waveguide, or mechanical variations to change the resonance wavelengths.

10. The device of claim 1, further comprising beam expanders on input and output waveguides to significantly reduce variations of a coupling loss due to mechanical movements in optical coupling elements that occur as temperature changes.

11. The device of claim 1, further comprising, a tuner that changes a wavelength of the incoming light to compensate for a temperature drift of the chip.

12. The device of claim 11, further comprising sensors to measure a chip temperature, being connected to a processing unit, the processing unit uses signals from the temperature sensors to calculate a tuning, required for the wavelength of the incoming light.

13. The device of claim 11, further comprising a detector to measure a power of the outputted light, the detector being connected to the tuner via a feedback loop to adjust the tuner to keep the incoming wavelength at a value providing the compensation for the temperature drift.

14. The device of claim 1, further comprising a first detector to detect an instant power of the incoming light and a second detector to detect an instant power of the outcoming light, both detectors being connected to a microwave phase detector, the microwave phase detector measuring a relative phase between outputs of the first and the second detectors and sending an obtained measured result to a controller, the controller comparing the obtained result with a required time delay and generating control signals to adjust resonant frequencies of each microresonator.

15. The device of claim 1, further comprising a first detector to detect an instant power of the incoming light and a second detector to detect an instant power of the outcoming light, where these two signals are utilized in a controller to provide self testing of the device when not in operation, and to provide optimum alignment of the microresonator resonance wavelengths when in operation as a tunable delay device.

16. A method for delaying of a signal imposed on a light beam, comprising: inserting the light beam into a time delay chip having M microresonators, M≥2; controlling resonant wavelengths of M resonators, by tuning within a range R≥(1+Delta)·FSR, where Delta describes a variation in resonance wavelengths of the microresonators, 1≥Delta≥0; thus achieving maximum available range of time delay for an output beam and cancelling of a temperature drift of a time delay chip.

17. The method of claim 16, wherein controlling the resonant wavelengths is achieved by heating.

18. The method of claim 16, further comprising
measuring the chip temperature, and
using the measured temperature to control the resonant wavelengths to obtain a given time delay of the chip.

19. The method of claim 16, further comprising
measuring a power of the output beam and using it to control the resonant wavelengths to obtain a given time delay of the chip.

20. The method of claim 16, where controlling is performed in a controller, the controller receiving an output of a microwave phase detector, the detector measuring a time delay between an incoming light into the chip and outgoing light from the chip.

* * * * *